Dec. 6, 1955  G. K. MOORE  2,726,005
TWISTOUT ARRANGEMENT FOR SHEET METAL BOX WALLS
Filed June 23, 1953

INVENTOR.
George K. Moore.
BY
ATTORNEY.

tes Patent Office 2,726,005
Patented Dec. 6, 1955

2,726,005

TWISTOUT ARRANGEMENT FOR SHEET METAL BOX WALLS

George K. Moore, Birmingham, Mich., assignor to Square D Company, Detroit, Mich., a corporation of Michigan Application June 23, 1953, Serial No. 363,647

8 Claims. (Cl. 220—24.3)

This invention relates to a twistout arrangement for a sheet metal front wall of an enclosure for electrical circuit controlling instrumentalities and has for its object the provision of a multiplicity of twistouts in a sheet metal wall where the twistouts are accommodated without unduly stressing the remainder of the wall.

Another object of the invention is the provision of a multiplicity of twistouts in a sheet metal wall in which the twistouts are immediately contiguous and are inclined to the plane of the wall.

Another object of the invention is the provision of a twistout arrangement in accordance with the preceding objects in which one edge of each twistout lies in the original plane of the wall and in which the opposite edge of the twistout is offset from the plane of the wall a distance less than the thickness of the wall so that the section edges are overlapped to prevent access through the wall between the sections.

Another object of the invention is to provide a sheet metal front wall for an enclosed electrical device in which a multiplicity of immediately contiguous twistouts are provided which are overlapped to prevent access therebetween and in which the wall after formation of the twistout remains substantially flat and unstressed.

Other objects and features of the invention will be readily apparent to those skilled in the art from the specification and appended drawing illustrating certain preferred embodiments in which.

In the mounting of a plurality of electrical circuit controlling instrumentalities, such as manually and automatically operable electric circuit breakers, it is desired to mount the instrumentalities within a small space, and for this purpose it is ordinarily desired to place the instrumentalities as close together as possible. In the optimum condition, the instrumentalities engage each other in transverse alignment and have the major portion of their front surfaces exposed through, and have the operating handles extend through, openings in the front wall of the enclosure, which wall may be further enclosed by an outer door if desired.

In the manufacture of such enclosures, the device may originally be sold with only a few instrumentalities in place, and others may be added in the field to meet the user's requirements. It is therefore desired to form the front wall with "twistouts" or "knockouts" originally closing the openings through the wall and which may be readily removed from the wall by the user as openings are desired. In forming these twistouts, the metal thereof is sheared from the metal of the wall, except at tie points which are only partially sheared so as to positively tie the removable sections or twistouts to the wall while providing for easy breaking of the ties to effect removal of the twistouts. After the shearing separation, the twistout is ordinarily pressed substantially back into the plane of the wall. In the past, the twistouts have been few in number when immediately contiguous, or they have been spaced apart by a portion of the original wall so that their pressing back into the plane of the wall has not been accompanied by undue stressing on the wall since the minor stretching of the twistout metal may be absorbed in the dimensions of the wall without unduly stressing the same.

According to applicant's invention, a large number of twistouts are formed in the front wall of the box in immediately contiguous relation, but in the pressing operation after the shearing only one major edge of each twistout is pressed back into the original plane of the wall. The opposite major edge of the twistout is pressed back a lesser distance so that its inner surface just underlaps the outer surface of the first edge so that the planes of the sections are inclined to the wall plane and present a substantially washboard surface where the twistouts are formed. In this manner, the stretching of the twistouts is countered by the inclination of their planes and the resulting structure does not unduly stress the sheet metal wall so that it remains flat after the twistout formation even though they are in large number and immediately contiguous. The result is to facilitate manufacture in rendering the wall unstressed so that it does not assume a bowed position and at the same time economize on space by accounting for the maximum number of instrumentalities within the box.

Figure 1:
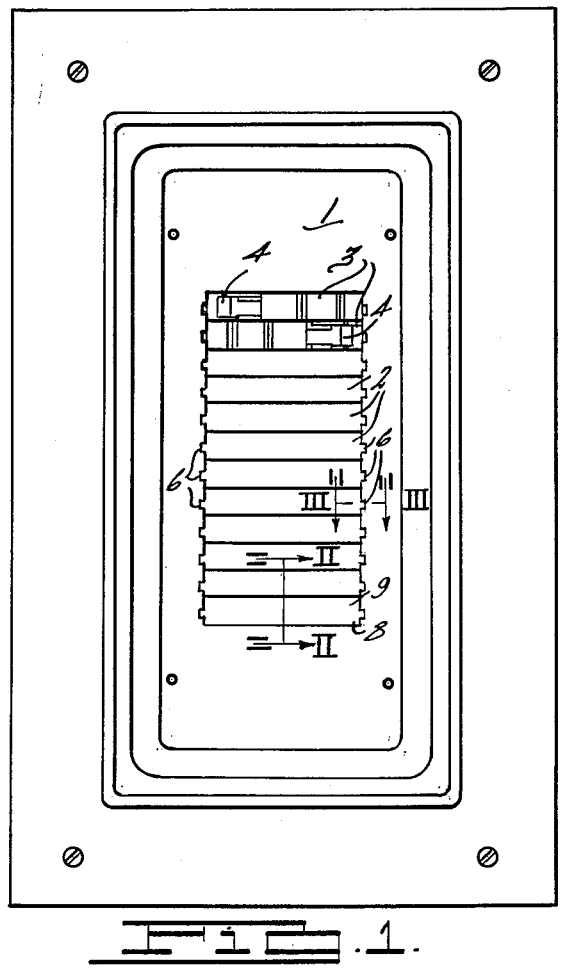
Figure 1 is a front elevational view of the front wall of the present invention for an enclosure for an electrical controlling instrumentality.
Figure 2:
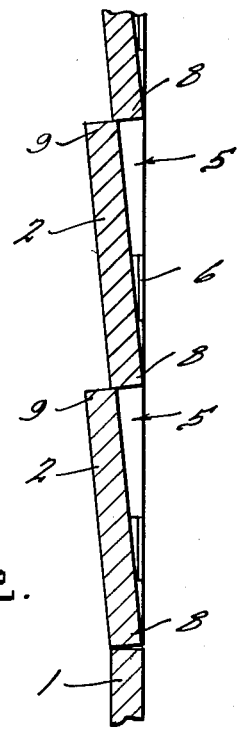
Figure 2 is a detail sectional view on the line II—II of Figure 1.
Figure 2:
Figure 3:
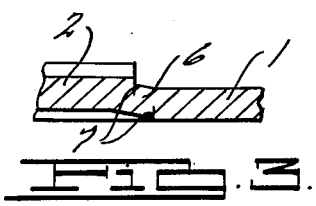
Figure 3 is a detail sectional view on the line III—III of Figure 1.

In the drawings, the invention has been illustrated in connection with a sheet metal front cover 1 for an enclosing box, not shown, having a multiplicity of twistouts 2 centrally disposed therein and shown in Figure 1 with the two upper twistouts removed to receive automatic electric circuit breakers 3 which are disposed in side by side engagement with the major portion of their front surfaces exposed through the openings and with their operating handles 4 projecting through the openings. The openings are generally indicated in Figure 2 by the arrows 5. It will be seen from the drawing that the sections 2 are substantially sheared from the sheet metal wall except for tie points 6 at the opposite minor edges of the sections 2. As will be seen from an inspection of Figure 3, the tie point 6 includes unsheared metal which interconnects the sections 2 with the front cover 1, although the tie point is partially sheared as at 7 to facilitate the twisting of the twistout section 2 from the wall.

In forming the twistout sections 2, they are first sheared from the sheet metal wall and from each other in conventional manner which shears each section about its entire periphery except for the tie points at 6 which are only partially sheared as indicated at 7. As the sections 2 are returned toward the plane of the wall, as is required to prevent openings between the sections and between the sections and the wall, the edges 8 are pressed back substantially into the plane of the wall which is substantially the position they originally were in before the shearing operation. The edges 9 of the twistout sections 2 are returned toward the plane of the wall a lesser distance so that they are offset outwardly from their original planes by a distance a little less than the thickness of the wall so that the inner surfaces of the edges 9 underlap the outer surfaces of the edges 8 as shown more particularly in Figure 2. This overlap closes the front of the enclosure entirely and prevents access into the enclosure between the sections and between the sections and the front wall. The resulting front surface of the wall at the twistout sections has substantially a washboard effect, as also shown in Figure 2.

With the inclined arrangement of the returned sections 2, their stretching, which is effected in the shearing operation, is accommodated so that in their completed position the twistout arrangement of the present invention occupies substantially the original length which the original metal occupied prior to the shearing operation. With this arrangement, any number of immediately contiguous twistouts may be placed in a sheet metal wall without difficulty and without unduly stressing or bowing the wall.

It will be noted that the tie points 6 are offset from the major axis of the sections so as to provide a greater twisting force as the sections 2 are manipulated to break the ties and effect removal of the sections from the sheet metal wall.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. In a sheet metal front wall for an enclosure for electrical circuit controlling instrumentalities, means providing openings exposing the major portion of the front surfaces of said instrumentalities and through which operating handles for said instrumentalities project, said means comprising a multiplicity of sections originally integral with said wall but substantially sheared therefrom except at integral tie points so as to be readily removable to provide openings through said wall as desired, said sections being immediately contiguous with their adjacent edges offset a distance less than the thickness of the sections and with opposite major edges of the sections offset in opposite directions whereby the planes of the sections are inclined to the plane of the wall and the section edges overlapped to prevent access through the wall thereat.

2. In a sheet metal front wall for an enclosure for electrical circuit controlling instrumentalities, means providing openings exposing the major portion of the front surfaces of said instrumentalities and through which operating handles for said instrumentalities project, said means comprising a multiplicity of sections originally integral with said wall but substantially sheared therefrom except at integral tie points so as to be readily removable to provide openings through said wall as desired, said sections being substantially rectangular and being transversely aligned in immediately contiguous relation with their adjacent major edges offset a distance less than the thickness of the sections and with the opposite major edges of each section offset in opposite directions whereby the planes of the sections are inclined to the plane of the wall with adjacent section edges overlapped.

3. In a sheet metal front wall for an enclosure for electrical circuit controlling instrumentalities, means providing openings exposing the major portion of the front surfaces of said instrumentalities and through which operating handles for said instrumentalities project, said means comprising a multiplicity of sections originally integral with said wall but substantially sheared therefrom except at integral tie points so as to be readily removable to provide openings through said wall as desired, said sections being immediately contiguous with their adjacent edges offset a distance less than the thickness of the sections and with opposite edges of the sections offset in opposite directions whereby the planes of the sections are inclined to the plane of the wall and the section edges overlapped to prevent access through the wall thereat, said tie points being located at the minor sides of and offset from the major axes of the sections.

4. In a sheet metal front wall for an enclosure for electrical circuit controlling instrumentalities, means providing openings exposing the major portion of the front surfaces of said instrumentalities and through which operating handles for said instrumentalities project, said means comprising a multiplicity of sections originally integral with said wall but substantially sheared therefrom except at integral tie points so as to be readily removable to provide openings through said wall as desired, said sections being substantially rectangular and transversely aligned with their major edges immediately contiguous, one major edge of each section lying substantially in its original plane and the other major edge lying offset from said plane but with adjacent section edges overlapped to prevent access through the wall between the sections.

5. In a sheet metal front wall for an enclosure for electrical circuit controlling instrumentalities, means providing openings exposing the major portion of the front surfaces of said instrumentalities and through which operating handles for said instrumentalities project, said means comprising a multiplicity of sections originally integral with said wall but substantially sheared therefrom except at integral tie points so as to be readily removable to provide openings through said wall as desired, said sections being substantially rectangular and transversely aligned with their major edges immediately contiguous, one major edge of each section lying substantially in its original plane and the other being offset from said plane a distance less than the thickness of the sections whereby the sections are overlapped with their planes inclined to the plane of the wall to present a substantially washboard surface for the sections.

6. In a sheet metal front wall for an enclosure for electrical circuit controlling instrumentalities, means providing openings exposing the major portion of the front surfaces of said instrumentalities and through which operating handles for said instrumentalities project, said means comprising a multiplicity of sections originally integral with said wall but substantially sheared therefrom except at integral tie points so as to be readily removable to provide openings through said wall as desired, said sections being substantially rectangular and transversely aligned with their major edges immediately contiguous, said tie points being partially sheared to facilitate breakage of the sections from the walls and being located at the minor edges of the sections, one major edge of each section lying substantially in its original plane and the other major edge being offset from said plane so that the planes of the sections are inclined to the plane of the wall.

7. In a sheet metal front wall for an enclosure for electrical circuit controlling instrumentalities, means providing openings exposing the major portion of the front surfaces of said instrumentalities and through which operating handles for said instrumentalities project, said means comprising a multiplicity of sections originally integral with said wall but substantially sheared therefrom except at integral tie points so as to be readily removable to provide openings through said wall as desired, said sections being substantially rectangular and transversely aligned with their major edges immediately contiguous, said tie points being located at the minor edges of said section and offset from the major axes thereof, one major edge of each section lying substantially in its original plane and the other major edge lying offset from said plane a distance less than the thickness of the sections whereby adjacent section edges are overlapped while the planes of the sections are inclined to the plane of the wall.

8. In a sheet metal front wall for an enclosure for electrical circuit controlling instrumentalities, means providing openings exposing the major portion of the front surfaces of said instrumentalities and through which operating handles for said instrumentalities project, said means comprising a multiplicity of sections originally integral with said wall but substantially sheared therefrom except at integral tie points so as to be readily removable to provide openings through said wall as desired, said sections being substantially rectangular and transversely aligned with their major edges immediately contiguous, said tie points being partially sheared from the wall so as to facilitate breakage of the sections from the wall and being located at the minor edges of the sections and offset from the major axes thereof, one major edge of each section lying substantially in its original plane and the other edge being offset from said plane a distance less than the thickness of the sections so that the adjacent section edges are overlapped while the section planes are inclined to the plane of the wall to present a substantially washboard surface for the sections.

References Cited in the file of this patent

UNITED STATES PATENTS

| Re. 19,092 | Despard | Feb. 20, 1934 |
| 833,296 | Bossert | Oct. 16, 1906 |
| 1,295,168 | Hooker | Feb. 25, 1919 |
| 2,014,444 | Miller | Sept. 17, 1935 |